Aug. 2, 1966    P. G. KASTER    3,263,757

PLOW DRAWN HARROW HITCH

Filed April 19, 1965    2 Sheets-Sheet 2

INVENTOR.
PAUL G. KASTER

BY Herbert A. Minturn
Attorney

INVENTOR.
PAUL G. KASTER
BY Herbert A. Minturn
Attorney

United States Patent Office 3,263,757
Patented August 2, 1966

3,263,757
PLOW DRAWN HARROW HITCH
Paul G. Kaster, R.R. 2, Shelbyville, Ind.
Filed Apr. 19, 1965, Ser. No. 449,113
2 Claims. (Cl. 172—198)

This invention relates to means for hitching a spike tooth harrow to a gang plow in such a manner that the harrow will follow the newly turned over soil and level it immediately to the rear of the plow, and further the hitch is so created that the harrow will be free to rock or even lift and fall within limits in riding over obstructions which may, for example, range from a clump of grass to a boulder.

By reason of this invention, the harrow may be so hitched behind the plow to be maintained at the proper alignment with the plow and may be even lifted as the entire plow may be when turning corners or being transported from one point to another.

A further important advantage of the invention resides in the fact that the harrow may be disengaged from the plow or attached to the plow through but three simple connections therewith.

These and other important objects and advantages of the invention will become apparent in the following description of one particular form as illustrated in the accompanying drawings, in which FIG. 1 is a view in top plan of a structure embodying the invention;

Figure 2:
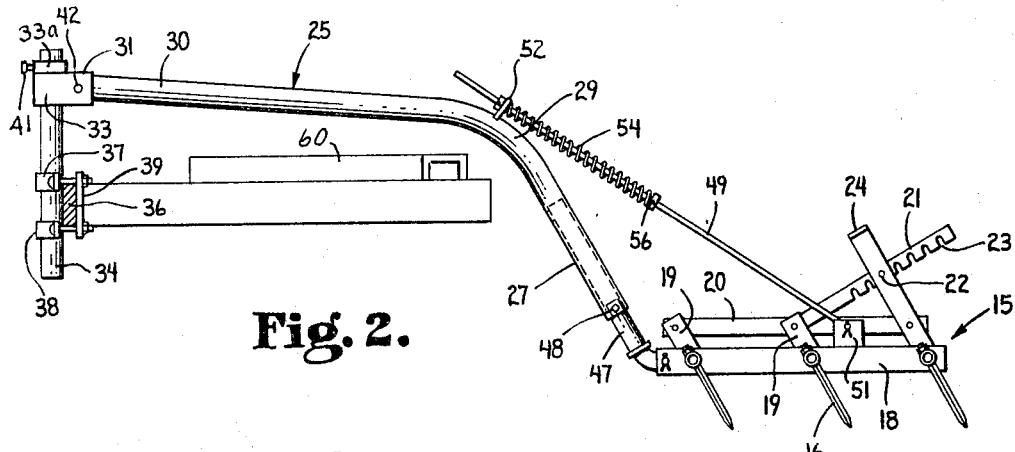
FIG. 2 is a detail in side elevation of one portion of the harrow hitch.

A tractor drawn plow is generally designated by the numeral 10 and is herein shown in one particular form as having five bottoms each designated by the same numeral 11. There are the usual plow beams 12, 13, 14, 15 and 16 each beam having one of the bottoms 11 attached thereto and suspended thereunder on a diagonal line as is well known to those versed in the art. The various beams are interconnected to the central beam 14 which extends forwardly to be employed as the draw bar for interconnection with the tractor (not shown).

A spike tooth harrow designated generally by the numeral 15 is also of the usual and well known type having a plurality of spikes or teeth 16 spaced apart along each of several bars 17, there being three of these bars in the present illustration of the invention.

A plurality of transverse bars 18, herein shown as two in number extend transversely across the three bars 17, and in the present showning receive the bars 17 revolvably therethrough so that the angles of the teeth 16 may be varied at will. To do so, there are the usual rocker arms 19, one fixed to each bar 17 and turned upwardly therefrom to receive a rocker member 20 pivotally engaged therewith so that by pushing the rocker member 20 in a fore and aft direction, the three tooth bars 17 may be rocked simultaneously. The rocking is accomplished normally by means of a notched bar 21 which drops down over a pin 22, the pin 22 being received selectively in one of the notches 23 and which pin is carried by a post 24 extending upwardly from and fixed to the rearmost bar 17. Preferably the rocker member 20 is located intermediate the ends of the bar 17 to be substantially across the central zones thereof, but varying somewhat due to the staggering of the center bar teeth 16 in relation to the teeth carried by the two other bars 17. All of this structure again is of the usual and well known type.

It is to this harrow structure that my invention is applied in order to hitch the harrow to the plow above described.

Two arched tubes 25 and 26 are formed to have approximately the same overall length, and are shaped to have normally downwardly and rearwardly turned lengths 27 and 28 respectively which lengths merge through an arch 29 in each instance and into a longer length 30.

Figure 3:
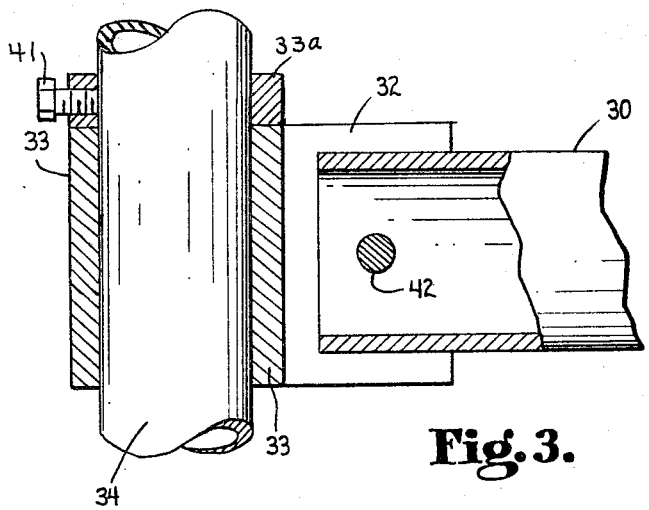
FIG. 3 is a detail in enlarged scale of the forward end connection of an interconnection between the forward end of the harrow pull bar and the plow itself.

The forward end of the length 30 is rockably engaged and confined to vertical travel between ears 31 and 32 of a bracket 33. This bracket is slidingly engaged over and around a post 34 which is approximately held in a vertical position on a suitable portion of the overall plow framework. In the present showing, without any limitation being intended to be imposed hereby as to this exact location, the bracket 33 is mounted on the forward side of a transverse leg 36 extending from the forward end of the beam 12 diagonally across to the beam 13. Any suitable means may be employed to hold the post 34 in a fixed position, herein shown as by means of clamps 37 and 38, FIG. 2, held by bolts passing through the straps and over and under the member 36 through an interconnecting strap 39 with bolts on the outsides thereof. The bracket 33 may slide vertically along the post 34 to an upper limit fixed by a collar 33a around the post in its path and fixed to the post by a set screw 41 passing through the collar 33a and abutting the side of the post 34, FIG. 3. The leg 30 of the tube 25 is interconnected with the bracket by means of a pin 42. The other tube member 26 is likewise secured to a forward portion of the plow 10, herein shown as by a mounting at the end of the tube 26 employing the same construction, to embody another post 34 carrying a bracket 33 therearound and into which bracket 33 the forward end of the tubular member 36 is rockably connected to be confined to up and down rocking.

The harrow 15 has each of the front transverse members 18 formed to have ears 43 and 44 between which a tongue 45 may be rockably secured. This tongue 45 appearing at the end of each of the members 25 and 26, that is at the lower ends thereof, is a part of a tube or rod 47 which telescopes within the lower ends of the tubular members 25 and 26, fitting slidably within the downturned lengths 27 and 28. This permits an adjustment of the height of the rear ends 27 and 28 by lifting or lowering these ends 27 and 28 relative to the members 47, the selected height being secured by means of a set screw in each instance indicated by the numeral 48.

In order to prevent up and down bouncing of the rear end of the harrow 15, a pair of stabilizing rods 49 and 50 are rockably attached to the members 18 herein shown as through brackets 51 and 52 secured to the sides of those members 18, and extending diagonally upwardly to an uppermost zone on the legs 27 and 28 where the rods slidingly pass through brackets 52 and 53 in turn fixed to the upper sides of those length 27 and 28. On each rod 49 and 50 there is carried slidingly therearound and therealong a coiled spring 54 and 55 bearing respectively by their upper ends against the brackets 52 and 53, and by their lower ends against collars 56 and 57 which are adjustably secured along the respective rods 49 and 50 by means of set screws 58. Thus, should the rear end of the harrow 15 tend to tip upwardly, that rocking of the harrow is resisted by the springs 54 and 55, the amount of resistance being determined by the initial compression of the springs as determined by the location of the collars 56 and 57 along the rods.

Figure 1:
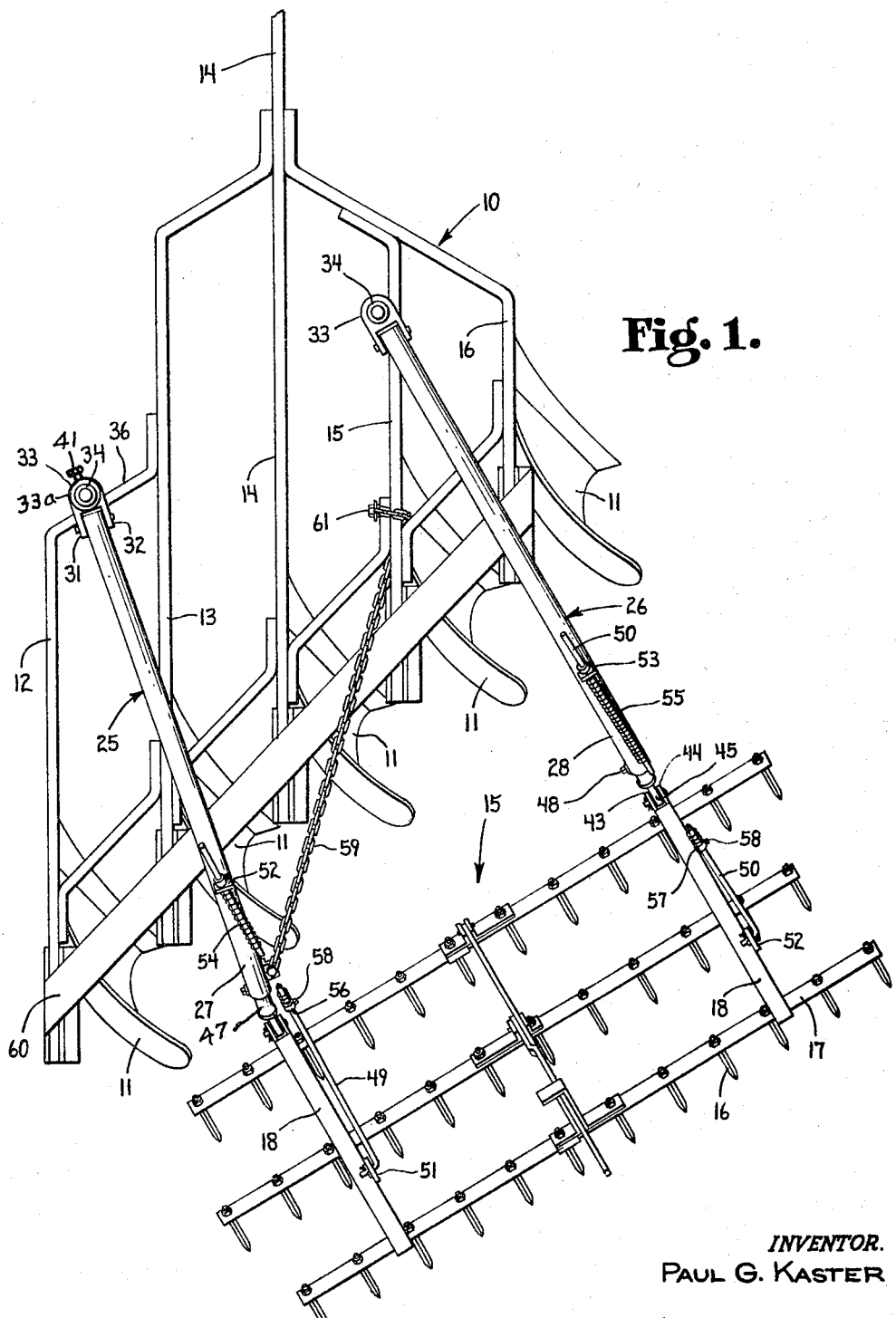

Now in order to maintain the harrow in the proper alignment with the plow, so that it does not tend to travel toward the left of the plow, a pull chain 59 is secured to a lower end portion of the member 25, FIG. 1, and brought up over a beam 60 extending diagonally across the plow structure and either tied around a plow member, or secured thereto by means of a bolt 61. The chain 59 is carried diagonally from the member 25 to be secured to the plow to maintain approximately the lower end of the member 25 on the draft line of the center beam 14.

In order to accomplish the best results, the harrow 15 is preferably mounted to extend in a diagonal manner across the overturned soil, and that is one of the prime reasons for employing the chain 59 so as to hold the alignment, and insure that the right hand teeth of the harrow reach over far enough to catch the first turned over dirt in reference to the forward one of five bottoms of the plow. The term "right hand" is employed only in reference to the plows shown as throwing dirt to the right. Plows may be made to throw to the left, in which case the harrow would be turned accordingly. Also, the curvatures of the members 25 and 26 are made to be such that they will clear this cross-beam 60 under normal action in service, and at the same time, will be close enough to the top side thereof in order to permit the lifting of the harrow body when the plow 15 may be lifted either hydraulically as is now common, or lifted upwardly onto transporting wheels, the hydraulic means and the wheels not being shown since they are not a part of the invention per se and in any event are well known to those versed in the art.

Therefore while I have described my invention in this one particular form, it is obvious that structural changes may be employed without departing from the spirit of the invention, and I therefore do not desire to be limited to this precise form beyond the limitations which may be imposed by the following claims.

I claim:
1. A hitch between a front dirt moving unit and a rear tandem dirt conditioning unit, wherein the front unit has a frame including transversely extending members and the rear unit has forwardly and transversely extending members, which hitch comprises
   a pair of draft members rising above and dropping downwardly, rearwardly on the front unit frame;
   an approximately vertically disposed post for each of forward ends of said draft members and fixed to said front unit frame and spaced ahead of the rearmost of said transverse members of that unit;
   means rockably securing said draft member front ends respectively to said posts;
   said means providing horizontal rotation of the draft members about said posts and also providing vertical travel of those draft member front ends up and down at the posts;
   means vertically rockably attaching rear, lower ends of the draft members to the forward side of said second unit to be vertically supported by the forward side of that second unit;
   pressure means yieldingly and hingedly interconnecting a rear portion of the second unit with each of said draft members at zones thereon spaced above the said forward side of the second unit and resisting upward rocking of the rear portion of that frame; and
   means between one of said draft members and said unit limiting lateral rotation of said draft members about said posts.

2. The structure of claim 1 in which there is
   a stop on each of said posts limiting the upward travel of said draft member front ends beyond a predetermined distance;
   said draft members normally being spaced above said forward unit transverse members during said dirt moving and conditioning operations; and
   said draft members fulcruming over one of said first unit transverse members upon lifting of that first unit one member, initially upwardly moving the forward ends of the draft members to the limits of said post stops and then lifting the second unit.

References Cited by the Examiner

UNITED STATES PATENTS

| | | | |
|---|---|---|---|
| 983,382 | 2/1911 | Mahan | 172—202 X |
| 1,580,145 | 4/1926 | Leyner | 172—739 X |
| 1,615,679 | 1/1927 | Bruning | 172—202 |
| 2,274,767 | 3/1942 | Zink et al. | 172—178 X |
| 2,960,169 | 11/1960 | Collins | 172—198 |
| 2,994,388 | 8/1961 | Ryan | 172—180 |
| 3,090,477 | 5/1963 | Hotchkiss | 172—178 |
| 3,090,448 | 5/1963 | Hotchkiss | 172—178 |

ABRAHAM G. STONE, *Primary Examiner.*

J. BOLT, *Examiner.*